(12) United States Patent
McIntyre et al.

(10) Patent No.: US 10,445,212 B2
(45) Date of Patent: Oct. 15, 2019

(54) CORRELATION OF FAILURES THAT SHIFT FOR DIFFERENT VERSIONS OF AN ANALYSIS ENGINE

(71) Applicant: Microsoft Technology Licensing, LLC, Redmond, WA (US)

(72) Inventors: Graham McIntyre, Issaquah, WA (US); Andrew Richards, Sammanish, WA (US); Michal Rusin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 15/594,530

(22) Filed: May 12, 2017

(65) Prior Publication Data
US 2018/0329800 A1 Nov. 15, 2018

(51) Int. Cl.
*G06F 11/07* (2006.01)
*G06F 11/36* (2006.01)
*G06F 16/28* (2019.01)

(52) U.S. Cl.
CPC ........ *G06F 11/3612* (2013.01); *G06F 11/079* (2013.01); *G06F 11/0751* (2013.01); *G06F 16/285* (2019.01)

(58) Field of Classification Search
CPC . G06F 11/079; G06F 11/3612; G06F 11/0793
See application file for complete search history.

(56) References Cited

U.S. PATENT DOCUMENTS

| 7,191,364 B2 | 3/2007 | Hudson et al. |
| 7,328,376 B2 | 2/2008 | McGuire et al. |
| 7,614,043 B2 | 11/2009 | Ognev et al. |
| 8,738,972 B1 * | 5/2014 | Bakman .............. G06F 11/0712 714/47.1 |
| 9,529,662 B1 | 12/2016 | Wangkhem et al. |
| 2003/0084376 A1 | 5/2003 | Nash et al. |
| 2004/0199828 A1 | 10/2004 | Cabezas et al. |
| 2009/0248753 A1 * | 10/2009 | Tsai ..................... G06F 11/0709 |

(Continued)

OTHER PUBLICATIONS

Ganapathi, et al., "Windows XP Kernel Crash Analysis",In the Proceedings of 20th Large Installation System Administration Conference, Dec. 3, 2006, 12 pages.
(Continued)

*Primary Examiner* — Yolanda L Wilson
(74) *Attorney, Agent, or Firm* — Fountainhead Law Group.P.C.

(57) ABSTRACT

In some embodiments, a data set is selected based on one or more applications experiencing events. A first analysis of the data set is received that classifies the data set into a first set of failures using an analysis engine configured with first classification logic that performs the classifying. A portion of the data set is selected to re-run based on the first set of failures. A second analysis of the portion of the data set is received that classifies the portion of the data set into a second set of failures using the analysis engine that is configured with second classification logic. A correlation of one or more first failures that shift to one or more second failures is determined. An annotation describing the shift in the one or more first failures to the one or more second failures is then output.

20 Claims, 9 Drawing Sheets

(56) References Cited

U.S. PATENT DOCUMENTS

| | | | | |
|---|---|---|---|---|
| 2010/0023919 A1* | 1/2010 | Chaar | .................... | G06Q 10/06 717/101 |
| 2010/0229023 A1* | 9/2010 | Gross | .................. | G06F 11/0724 714/2 |
| 2010/0241903 A1* | 9/2010 | Goldszmidt | ........ | G06F 11/0709 714/38.14 |
| 2011/0078298 A1* | 3/2011 | Sakai | .................. | G06F 11/0709 709/223 |
| 2015/0074035 A1* | 3/2015 | Narasappa | ............. | G06N 7/005 706/52 |
| 2015/0193294 A1* | 7/2015 | Hladik, Jr. | .......... | G06F 11/0709 714/47.3 |
| 2016/0092290 A1* | 3/2016 | Gerstl | ................... | G06F 11/079 714/37 |
| 2016/0162348 A1* | 6/2016 | Bernstein | ............. | G06F 11/079 714/37 |

OTHER PUBLICATIONS

Murphy, Brendan., "Automating Software Failure Reporting", In Magazine Queue—System Failures, vol. 2, Issue 8, Nov. 2004, pp. 43-48.

* cited by examiner

CORRELATION OF FAILURES THAT SHIFT FOR DIFFERENT VERSIONS OF AN ANALYSIS ENGINE

BACKGROUND

Software applications may experience events, such as crash events and/or hanging events, that affect the operation of the software applications. When an event occurs, a log file is generated describing the event. The application can then send the log file to a provider, such as the provider of the operating system and/or application.

A provider may receive a large number of log files; for example around 4 billion log files may be received in a single day. The provider may then analyze the log files to classify the events into a set of failures. It is possible that users may be experiencing the same problems, and multiple events may be classified into the same failure. For example, the events corresponding to the 4 billion log files may be classified into a smaller number of failures, such as 3 million failures. The analysis of the large number of log files requires a large amount of resources. For example, an analysis engine may run at scale on a large amount of computing resources to perform the classification.

DETAILED DESCRIPTION

Figure 1:
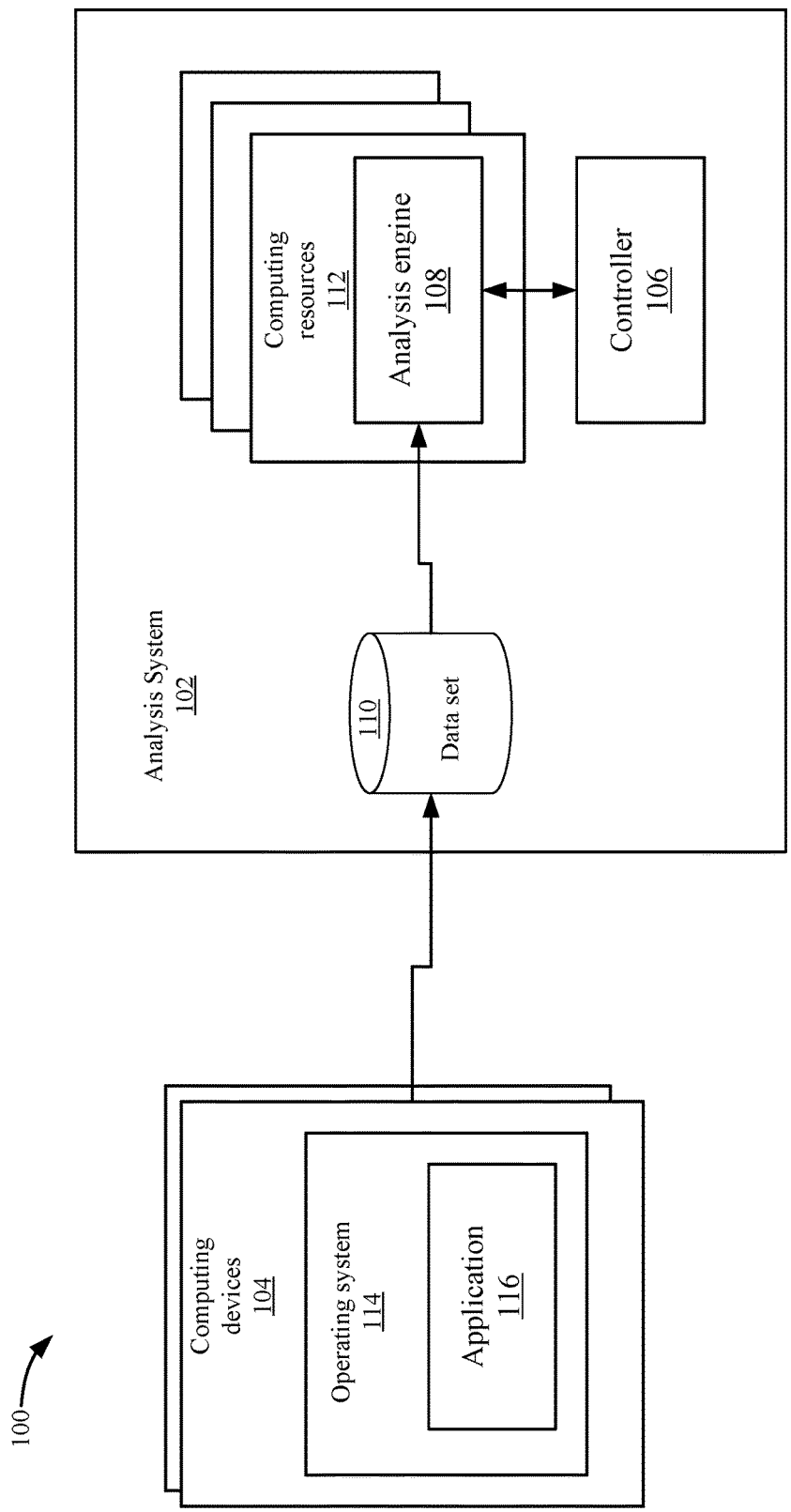
FIG. 1 depicts a simplified system for analyzing events that occur while using one or more software applications according to some embodiments.

In the following description, for purposes of explanation, numerous examples and details are set forth in order to provide an understanding of certain embodiments. It will be evident, however, to one skilled in the art that some embodiments can be practiced without some of these details, or can be practiced with modifications or equivalents thereof.

Some embodiments receive a data set including information that is generated based on one or more applications experiencing events, such as crash events or hanging events. The data set may include a number of log files that describe the events that occurred for the applications. Then, an analysis engine performs a first analysis of the data set to classify the events into a first set of failures. For example, the analysis engine may be a first version that uses a first version of classification logic to perform the classifying. The classification may combine similar events into the same failure, which reduces the number of events into a fewer number of failures.

A second version of the analysis engine may then be developed that includes different classification logic from the first classification logic. Due to the change in classification logic, the second version of the analysis engine may classify some of the original events in the data set into a different set of failures. To document this change, some embodiments map the shift in failures due to the change in classification logic, which requires re-running the second version of the analysis engine on the data set. For example, at some point, the second version of the analysis engine will replace the first version. If a failure suddenly changes from 1 million occurrences to a very small number, a user may think the failure is not occurring anymore. However, the second version of the analysis engine may instead be classifying the events corresponding to that failure into multiple different failures due to the change in the classification logic.

Re-running the second version of the analysis engine on the entire data set that was received consumes a large amount of computing resources and also time. For example, the first version of the analysis engine may be run at scale using a large number of computing resources distributed over many computing devices. To run another analysis using the second version of the analysis engine over the entire data set would use a lot of computing resources in addition to taking a large amount of time. To save computing resources and time, a controller may select a portion of the data set to re-run using the second version of the analysis engine. The portion of the data set may be selected based on the first set of failures that were determined. For example, certain log files in a data set may be selected based on the failures in the first set of failures. This may ensure that a second analysis is representative of the first analysis.

The second version of the analysis engine then performs the second analysis of the portion of the data set to classify the portion of the data set into a second set of failures. As discussed above, the second version of the analysis engine uses the second classification logic to perform the classifying, and this may result in a shift of some of the first set of failures being changed to other failures. Some embodiments may correlate the first failures that shift to second failures due to the re-running. Then, an annotation describing the shift is generated to note the change that results from using the second classification logic instead of the first classification logic. The annotation may be output and help guide a user that is analyzing failures. The annotation informs a user how failures may shift to different failures due to the second version of the analysis engine going live.

Analyzing the portion of data saves computing resources and takes less time compared to re-analyzing the entire data set. However, because only a portion of the data set is analyzed, some embodiments may determine whether the second set of failures that results from the second analysis is acceptable. For example, some embodiments apply rules for the second set of failures and determine if the rules meet a threshold. If the threshold is not met, some embodiments may perform the second analysis again using another portion of the data set, such as a larger portion of the data set and/or different log files from the data set. This process continues until the analysis engine generates a second set of failures that some embodiments consider acceptable. Accordingly, some embodiments can analyze a smaller portion of the data set using less computing resources and time, but ensure that the resulting second analysis is acceptable.

Overview

FIG. 1 depicts a simplified system 100 for analyzing events that occur while using one or more software applications according to some embodiments. System 100 includes an analysis system 102 and computing devices 104. Computing devices 104 are executing software applications, such as an operating system 114 and/or an application 116. Analysis system 102 may include a controller 106, an analysis engine 108, and storage 110.

Computing devices 104 may be executing multiple versions of an operating system 114 that are running multiple versions of an application 116. In other embodiments, the analysis may be performed on a single application, a single operating system, or other combinations of multiple applications. For discussion purposes, the failure classification may be affected by different factors that include the application version, the operating system version, the log file contents, and the version of analysis engine 108. In some embodiments, the analysis may be performed for different instances of applications. For example, failures for a second application are analyzed separately from failures from a first application (the operating system may be the same or different).

As discussed above, at certain times during use of software application 116, events may occur, such as crash events or hanging events, that affect the performance of software application 116. The crash event may cause application 116 and/or operating system 114 to stop operating causing a reboot of the application 116 and/or operating system 114. The hanging event may cause the application 116 and/or operating system 114 to pause operating for a certain amount of time. Although these events are discussed, other events may also be appreciated, and also do not need to affect performance negatively. For example, the events may involve commands that are received, actions that are performed, etc.

When the events occur, computing devices 104, such as application 116 and/or operating system 114, create information that describes the event. For example, a log file is created that describes aspects of the event that occurred. Computing devices 104 send these log files to analysis system 102, which are stored as a data set in storage device 110. Many different events may occur across computing devices 104 in addition to the same event occurring. Analysis system receives a log file for each instance of an event. A large amount of log files may be received and stored in storage 110 in the data set. The data set may be organized in slices, which encompass log files from a time range, such as an hour, a single day, a week, or other time periods.

A controller 106 may control the operation of the analysis of the data set. For example, controller 106 may schedule a number of computing resources 112 to perform the analysis using analysis engine 108. Computing resources may be any physical or virtual component of limited availability within a computer system. In one example, computing resources 112 may perform the analysis at scale, such as on multiple computing devices. Controller 106 may be located on a separate computing device from the computing resources that perform the analysis, or on the same computing resources. Also, controller 106 may be separate from or part of analysis engine 108.

Analysis engine 108 may receive the data set from storage 110 and classify the information from the log files into a signature of an issue, such as a first set of failures. A failure may be an event that negatively affected the performance of the application. For discussion purposes, failures will be discussed, but the result of the analysis may be any type of issue including issues that do not negatively affect the performance of the application. For example, the number of log files may be classified into specific failures, such as failures A, B, C, etc., where A, B, and C are identifiers for the type of failure. To classify the events, analysis engine 108 may use classification logic that analyzes the information in the log files to determine a signature for the information. A signature is a unique quality of the information that can be classified into a type of issue, such as a type of failure for each event. Analysis engine 108 may then output the first set of failures in an outcome file, which is stored in storage 110. The failures are sent for triage, which is a service that may attempt to fix the issue caused by the failures.

The analysis performed by analysis engine 108 may be distributed across a full set of computing resources 112 executing on multiple computing devices in some embodiments. In some embodiments, the amount of computing resources that can be used may be within a range. The top range may be used for the first analysis. Also, a first version of analysis engine 108 may analyze the entire data set. For example, for a configured time range, such as one day, analysis engine 108 analyzes all of the log files that were received during that time slot. The first analysis may also be continuously performed as log files are received.

Over time, analysis engine 108 may have its classification logic changed. For example, observation of the failures leads to refinements to the classification logic of analysis engine 108. Using the same application version, operating system version and log file contents, the change in the classification logic of analysis engine 108 may result in a shift in failures that are determined from the same data set. The failures may change due to different factors, such as a provider may classify a failure with higher granularity. Also, additional information may be received that can change the classification. The shift in failures that occurs may be correlated in a 1:1 (e.g., equal or translation), 1:N, or an N:1 correlation. The 1:1 equal correlation is where a failure A is still failure A, or a failures AB (includes both failures A and B) is still failures AB. The 1:1 translation correlation is where a failure A becomes another failure, such as a failure B, or failures AB become failures BC (includes both failures B and C). A 1:N refinement is where a failure A becomes N failures, such as a failure A becomes a combination of failure A, failure B, failure C, and so on. Also, failure A may become failures AB, or failures AB may become failures ABC (includes both failures A, B, and C). An N:1 grouping is when N failures become a single failure. For example, failures A, B, and C become failure X (e.g., failure A, failure B, failure C or another failure D). Also, failures AB may become failure A, or failures A, B, and C become failures AB.

Once the classification logic is altered, the version of analysis engine 108 is changed, such as from a version #1 to a version #2. A second analysis may be performed before the second version of analysis engine 108 goes live to replace the first version. For example, at some point, the first version of the analysis engine may be replaced by the second version. If a shift analysis is not performed and the shift of failures is not annotated, it is possible that a rate of occurrence of failures will drastically change when the switch to the second version occurs without any notification to users. For example, the number of failure A's may disappear, drop, or appear, or become more or less prevalent once the second version of analysis engine 108 goes live. Analysis engine 108 performs the shift analysis on the data set previously analyzed and annotates the shift to provide users with notification as to how failures may change when the second version goes live.

Instead of re-analyzing the entire data set that was analyzed previously, such as the data set that includes a day, multiple days, a week, etc., of log files, controller 106 may configure the second version of analysis engine 108 to only analyze a portion of the data set. To save computing resources, controller 106 may configure analysis engine 108 to run on a smaller percentage (e.g., 1%) of computing resources 112. For example, if the first analysis was performed using 2500 servers, controller 106 configures this second analysis to run on 25 servers.

Controller 106 selects a portion of the data set to analyze on the smaller amount of servers. Controller 106 may use different techniques to filter that log files to select the portion of the data set, which will be described in more detail below. Also, different log files may be included in the portion of the data set that were not originally analyzed. This may be because parts of the original data set may not be available anymore and other log files may be substituted.

Controller 106 starts the shift analysis by transferring the portion of the data set to analysis engine 108. Analysis engine 108 may then analyze the portion of the data set on the scheduled computing resources 112. Using the second classification logic, analysis engine 108 outputs a second set of failures in a second outcome file.

Controller 106 receives the second outcome file and compares the second outcome file to the first outcome file to determine a shift in some of the failures. For example, a failure A may be found 1,000,000 times in the first analysis, but in the second analysis, failure A is found 500,000 times. Instead, analysis engine 108 may classify some of the log files identified as failure A in the first analysis as failure B, failure C, and failure D in the second analysis, which represents a 1:N correlation. Other correlations may also be determined. Controller 106 uses correlation logic to correlate that failure A in the first analysis shifted to the instances of failure B, failure C, and failure D. In this case, the 1,000,000 failures of A may be distributed between 500,000 failure A's, 400,000 failure B's, 50,000 failure C's, and 50,000 failure D's. The correlation may be performed by reviewing the log files that are the source of the failures in the first outcome file and the second outcome file and correlating the failures from the source. For example, a first log file resulted in a failure A in the first outcome file became a failure B in the second outcome file.

Because only a portion of the data set was used, it is possible that the analysis may not be acceptable. For example, controller 106 may not have the confidence that the portion of the data set that was analyzed provided a reliable outcome. To check the accuracy, controller 106 applies rules to an analysis of the second outcome file, and determines whether the rules meet a threshold. For example, as described in more detail below, controller 106 attempts to find a data set where the percentage of failures determined remains stable within a percentage even as the data set is increased. This means that using 1000 log files compared to 10,000 log files would not change the percentages of failures determined within a threshold.

If the threshold is not met, controller 106 may perform the second analysis again with a different portion of the data set. The different portion of the data set may include more data, such as log files, and/or different data, such as removing some log files that were previously analyzed and adding different log files. It is also possible that controller 106 may need to provision additional computing resources if additional data is being analyzed. However, controller 106 may use the same amount of resources for a number of iterations until a certain amount of the data set is reached. This may increase the time of the analysis. However, the provisioned computing resources 112 in the second analysis still are less than the provisioned computing resources 112 in the first analysis.

Analysis engine 108 can then perform the second analysis again using the different portion of the data set. Another second set of failures is generated in a second outcome file. Controller 106 performs a similar analysis to determine whether or not the second outcome file is acceptable. The process continues to reiterate with another portion of the data set until controller 106 finds a second set of failures in a second outcome file that is acceptable.

After accepting a second outcome file, controller 106 may annotate specific failures in the shift that result from the first outcome file to the second outcome file. For example, controller 106 may generate an annotation that describes which first failures shifted to which second failures the shift due to the execution of the second version of analysis engine 108 versus the first version of analysis engine 108. Analysis engine 108 uses the correlations to generate the annotations.

Analysis System 102

Figure 2A:
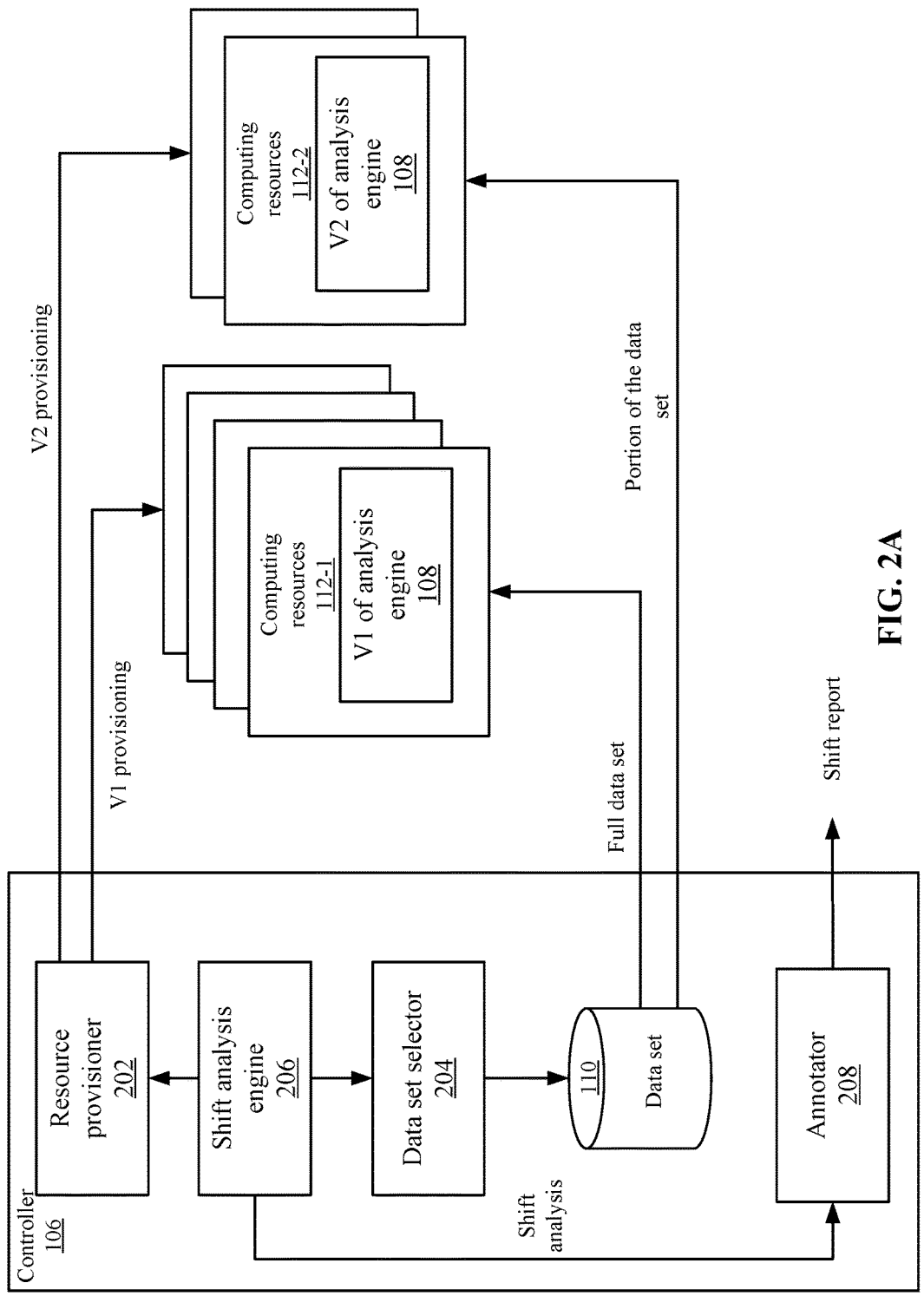
FIG. 2A depicts a more detailed example of an analysis system according to some embodiments.

FIG. 2A depicts a more detailed example of analysis system 102 according to some embodiments. Controller 106 includes a resource provisioner 202, a data set selector 204, a shift analysis engine 206, and an annotator 208. Resource provisioner 202 provisions computing resources 112 for analysis engine 108. As mentioned above, different computing resources 112 may be scheduled based on the analysis being performed and the amount of data being analyzed. For the first analysis of the full data set, resource provisioner 202 may provision the largest amount of computing resources 112-1 that can be configured for an analysis. In one example, the configured amount of computing resources 112-1 may be pre-set for the full data set.

Data set selector 204 can then select the data set to be used by analysis engine 108 on the provisioned computing resources 112-1. The full data set from storage 110 is provided to computing resources 112-1. Then, the first version (V1) of analysis engine 108 may run on computing resources 112-1 to process the full data set to generate the first set of failures in the first outcome file.

Shift analysis engine 206 receives the first set of failures in the first outcome file and analyzes the first set of failures to determine a subset of the data set. Data set selector 204 can then select the portion of the data set and provide the data set to the second version (V2) of analysis engine 108.

In one example, shift analysis engine 206 wants to compare failures that result from a data set in the first set of failures to failures that result using the second version of analysis engine 108. Shift analysis engine 206 generates the data set to start the analysis based on one or more criteria, such as attributes of an application (e.g., the application name (e.g. process name, package name, etc.), application version, and OS Version). Applying this filter yields a number of log files that are associated with the attributes. A number of log files are needed to perform the analysis. For instance, if the criteria only yielded under 100 log files, then the shift analysis might not be useful. In one example, shift analysis engine 206 compares the number of log files to a threshold to determine whether the criteria needs to be relaxed or not. For example, if over 500 log files are selected, then the criteria is acceptable. If under 500 log files are selected, then shift analysis engine 206 may relax the criteria. For example, shift analysis engine 206 weakens the attributes for the application version or OS Version. For example, if the application is identified by 4-digit versions—Major.Minor.Build.Revision (1.2.3.4), then some aspect of the identifier may be relaxed. Instead of the application version of 1.2.3.4 being used as criteria, the application version of 1.2.3.*, where "*" is a wildcard, could be used to find log files for more versions of the application. The OS version attributes may also be relaxed similarly. Different combinations of relaxing the application version and the OS version may be tried to increase the number of log files. For instance, the application version is further relaxed to 1.2.*.* or the OS version is relaxed to 10.11.12.*, and so on.

Also, shift analysis engine 206 reviews the occurrence rate of events in the data. A typical occurrence rate may be 1% of the failures comprise 99% of the events. Conversely, 90%+ of the failures are observed at an occurrence of one per day—when averaged over a week/month. These low frequency failures may be referred to as long tail failures, which due to the low rate of occurrence, do not individually comprise a sufficient number of log files to determine the rate of change caused by the second version of analysis engine 108. For example, the change may cause a 1% change across thousands and millions of log files of that failure, but when the rate of change is determined with a limited number of log files (e.g. 10), those log files may disproportionately represent the 1% change. Shift analysis engine 206 filters log files from the data set based on the above concept. For example, shift analysis engine 206 removes log files there is insufficient data to produce a statistically accurate rate, and the log file may be a long tail failure. The long tail type of failure is commonly triaged as "Will Not Fix" due to the lack of occurrences (e.g., very low impact), and thus, causing a re-triage of the issue as a new failure type may be an unwanted burden for a provider. If the effect of using the second version of analysis engine 108 is to group failures together, the failure occurrence rate will increase, causing the grouped failures to be raised for triage—annotated as a new issue, rather than as a shift. The long tail failures that "disappear without annotation" could be (automatically) triaged as "Rejected" based on the occurrence rate dropping to 0.

Shift analysis engine 206 may also determine an amount of computing resources 112-2 that should be provisioned for a second version of analysis engine 108. The amount of computing resources 112-2 may be determined based on the amount of data in the data set. For example, if only 1% of the data in the data set will be re-analyzed, then 1% of the computing resources 112-1 may be used. Resource provisioner 202 then provisions computing resources 112-2 for the second version of analysis engine 108.

Once shift analysis engine 206 determines the acceptable number of log files as the portion of the data set, shift analysis engine 206 knows the distribution of failures from that portion for the first version of analysis engine 108. The second version of analysis engine 108 then performs the analysis of the portion of the data set using the second classification logic. The second analysis produces a second set of failures in a second outcome file, which is provided to shift analysis engine 206 in the second outcome file.

Shift analysis engine 206 can then determine a shift in failures from the first set of failures to the second set of failures. There may be multiple different shifts that occur for different failures. Shift analysis engine 206 uses correlation logic to correlate the one or more first failures that shift to one or more second failures.

In reviewing the different shift in failures, shift analysis engine 206 determines if the results of the second analysis are acceptable. Shift analysis engine 206 may apply rules to determine whether or not a larger data set may be needed based on the shift in failures from the first outcome file to the second outcome file. The shift analysis attempts to explain the rate of change of failures at a statistical level that is acceptable for subsequent triage decisions. That is, there may be little value to determining the exact rate of change when a small sample is (relatively) indicative of a larger sample. For example, considering the following analysis of different numbers of log files:

100 log files→90 (Failure A 90%), 10 (Failure B 10%)
1,000 log files→890 (Failure A 89%), 105 (Failure B 10%), 5 (Failure C 1%)
10,000 log files→8900 (Failure A 88%), 1150 (Failure B 11%), 45 (Failure C 0.5%), ~5 (Failure D~0.1%)

Looking at the change from 100 log files to 10,000 log files, the change in the rate of failure A is +/−1%, the change in the rate of Failure B is +/−1%, the change in the rate of Failure C is below 1%, making it insignificant from a triage perspective, and the change in the rate of Failure D is below 1%, making it insignificant from a triage perspective. The change in failure A and failure B may also not be significant when 10,000 log files are used instead of 100 log files.

The determination if a larger portion of the data set may be based on the consistency at a scale level. Different log files sets may be analyzed, such as a first 100 log file data set and a second 100 log file data set. If the rate of failures for each is within X % (e.g. +/−3%), the results suggest that a larger sample size (e.g., 1,000 log files vs 10,000 log files) is not required. If the shift is outside the range of X %, shift analysis engine 206 may increase the portion of the data set used by a factor Y (e.g., via addition or multiplication of the previous portion). The factor is increased while diversity on the results is experienced. Iteration continues until the deviation is outside the acceptable percentage (X), or the data set is fully re-analyzed (100% coverage of log files).

If the results are not acceptable, the process is performed again. Shift analysis engine 206 re-determines a different portion of the data set based on the shift in failures. Also, depending on the size of the data set now being used, shift analysis engine 206 may or may not determine additional computing resources 112-2 to provision. The process then continues with data set selector 204 selecting a different portion of the data set and resource provisioner 202 possibly provisioning additional computing resources 112-2. The second version of analysis engine 108 then runs the second analysis using the second classification logic again on the new portion of the data set. Once the second set of failures is generated again, shift analysis engine 206 performs the same analysis to determine if the shift between the first set of failures to the second set of failures is acceptable or not. If not, the process continues again as a different portion of the data set is adjusted along with possibly additional computing resources 112-2.

The following describes one example of determining whether the results are acceptable. If the number of log files is 10,000 that match the criteria, shift analysis engine 206 knows the percentages of failures that result for the 10,000 log files. Shift analysis engine 206 selects a first portion (e.g., sample S1) of 100 log files and the second version of analysis engine 108 determines the percentage of failures from the 100 log files. Shift analysis engine 206 then applies rules to determine if the results meet a threshold, which may be that one or more rules are met. For example, shift analysis engine 206 applies a first rule based on if the percentages of failures are within a threshold (e.g., 3%), the sampling is considered acceptable, such as 90% failure A's determined in the 10,000 log file sample and 89% failure A's determined in the 100 log file sample S1 meets the threshold. If a failure in the sample does not meet the threshold, then another analysis is performed with another sample. For example, if 90% failure A's become 70% failure A's in sample S1, then another sample is analyzed.

Shift analysis engine 206 may also apply a second rule related to new failures that result in the sample S1. For example, a failure D may appear in the sample S1 that was not found in the 10,000 log file sample. Shift analysis engine 206 may compare the percentage of the new failure to a threshold to determine if another analysis should be performed. For example, if the new failure doesn't have at least X % (e.g. 1%), this new failure does not trigger a new analysis. This is because the new failure is likely to be insignificant and can be ignored. If the new failure is >X % (e.g., 5%) but <Y % (10%), this failure does not trigger another analysis. However, if the new failure is >Y %, this failure triggers a new analysis. This rule determines whether or not a new failure is significant enough that the appearance should be verified again. Although these thresholds are used, different threshold may be used, such as only one comparison to determine if a new failure is above 10% or not to trigger a new analysis.

In a subsequent analysis, shift analysis engine 206 selects another portion (e.g., sample S2) of 100 log files and the second version of analysis engine 108 determines the percentage of failures from the 100 log files. Shift analysis engine 206 then applies rules to determine if the results are acceptable, but this time the comparison is between sample S1 and sample S2. Now, shift analysis engine 206 is looking for stability between the samples of the second version of analysis engine 108 unlike the first comparison between the first version and the second version. It is noted that the first comparison may also be skipped and stability between samples of the second version of analysis engine 108 may only be used. Once shift analysis engine 206 can determine that adding 100 log files does not result in a significant shift, then shift analysis engine 206 can determine that additional analysis is not needed. Shift analysis engine 206 applies the same first rule and second rule between the failures in sample S1 and sample S2. For example, shift analysis engine 206 applies a first rule based on if the percentages are within a threshold (e.g., 3%) between sample S1 and sample S2. Then, shift analysis engine 206 applies the second rule to new failures result in sample S2.

If another analysis is needed, shift analysis engine 206 selects a third sample S3 of 100 log files. The comparison may then be between the failures in sample S1 and sample S2 compared to the failures in sample S3. The failures in sample S1 and S2 are combined for the comparison to the failures in sample S3. However, only the most recent previous sample may be used instead of all the previous samples. This process continues where failures compared are Sample S1+Sample S2+ . . . +Sample N compared to Sample N+1. This process continues until possible all 10,000 files are analyzed or the failures in a sample are within a percentage of the failures found in the prior samples.

Figure 2B:
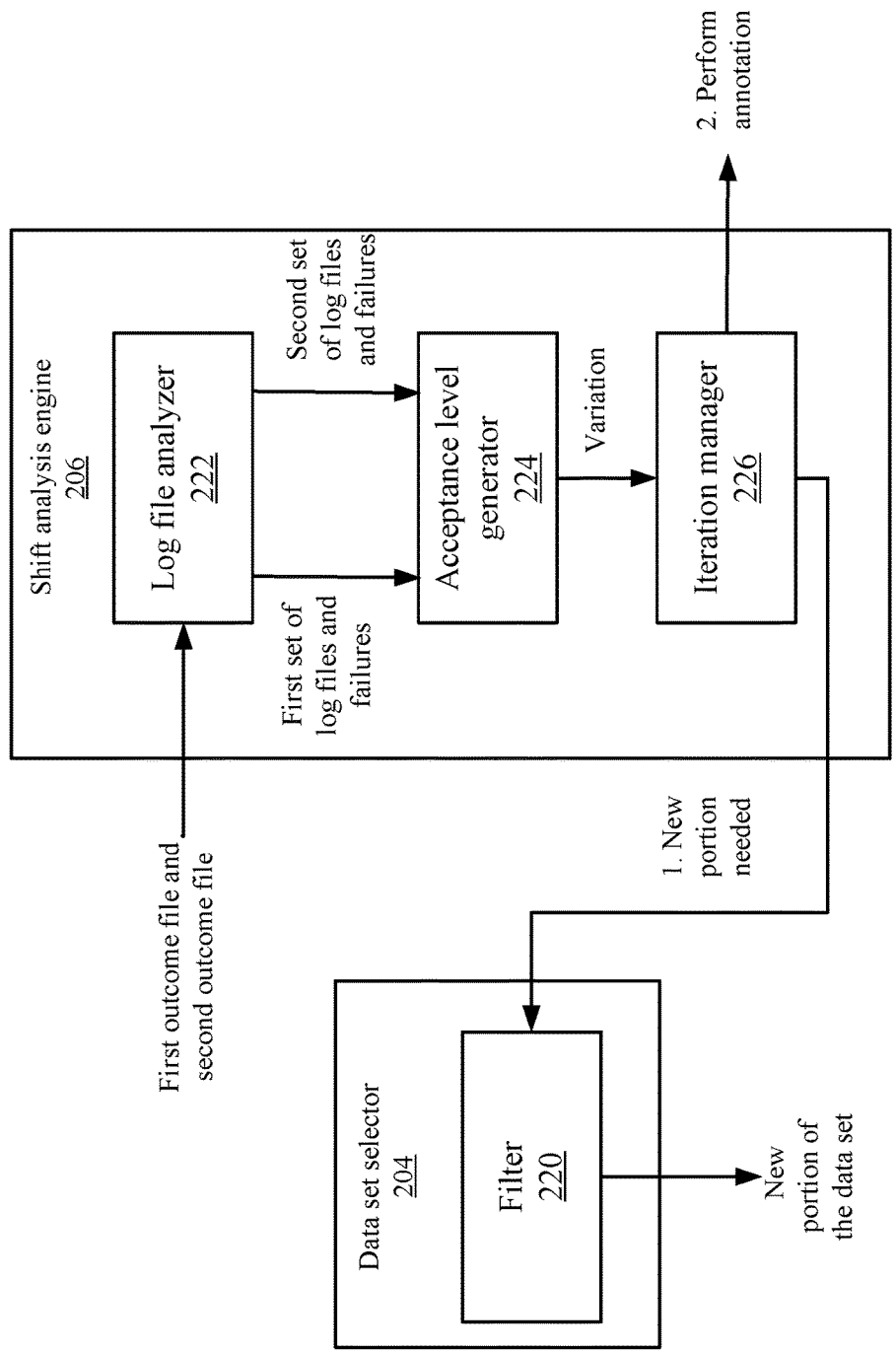
FIG. 2B depicts a more detailed example of a shift analysis engine and a data set selector showing the determination of whether the second set of results is acceptable according to some embodiments.

FIG. 2B depicts a more detailed example of shift analysis engine 206 and data set selector 204 showing the determination of whether the second set of results is acceptable according to some embodiments. A log file analyzer 222 receives the first outcome file and the second outcome file and can determine two separate sets of log files that resulted in the same failure in the first outcome file. The variation in the second outcome file is then determined. For example, as described above, a failure A may be become a first set of failures for the first set of log files and a failure A may become a second set of failures for the second set of log files. Although failure A is discussed, this process may be performed for a number of failures, such as failures A, B, C, and so on in the first outcome file.

An acceptance level generator 224 analyzes a variation between the first set of failures and the second set of failures. For example, acceptance level generator 224 compares the shift for both sets of log files to generate a variation between failures in the two sets of log files. Acceptance level generator 224 sends the variation to an iteration manager 226, which applies the rules to determine if another iteration is needed. If the variation is outside of the threshold (e.g., does not meet) or a new failure is above a percentage, then iteration manager 226 determines that another iteration with a larger amount of the data set is needed. Iteration manager 226 contacts filter 220, which can select a factor (e.g., addition or multiplication) of the previous portion for another analysis. If the rules meet the thresholds, then iteration manager 226 determines that another iteration is not needed and the annotation can be performed. The iteration continues until the entire data set is analyzed or iteration manager 226 determines the rules are met.

When shift analysis engine 206 determines that the second set of results is acceptable, the correlation between the failures in the first set of failures that shift to the second failures in the second set of failures is provided to annotator 208. Annotator 208 can then annotate the shift. The annotation may note a confidence level that is calculated by shift analysis engine 206 for the second set of failures. For example, annotator 208 may note information for that the shift is provided with a 90% confidence. The confidence may be generated based on the variation in failures or new failures determined. For example, the confidence level may be based on the variation determined when analyzing multiple log files for a failure. The confidence level may also be based on the amount of the portion of data used in the second analysis. Also, the annotation may indicate the specific shifts of failures that occurred, such as 100% of failure A became X % of failure A's, Y % of failure B's, and Z % of failure C's. Annotator 208 can then output a shift report that discloses the annotated shift analysis.

Annotation Example

Figure 3A:
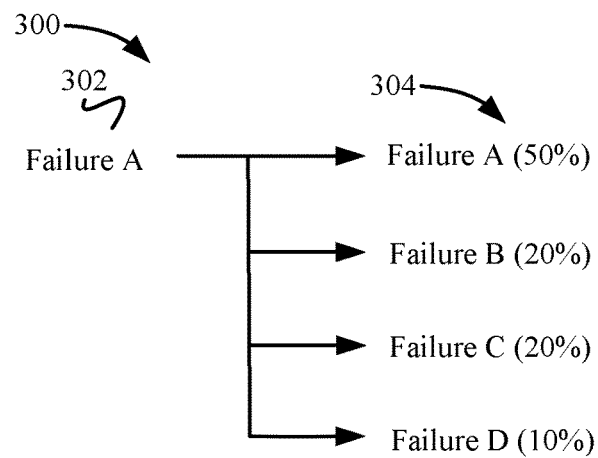
FIG. 3A shows an example of a chart showing a shift annotation according to some embodiments.
Figure 3B:
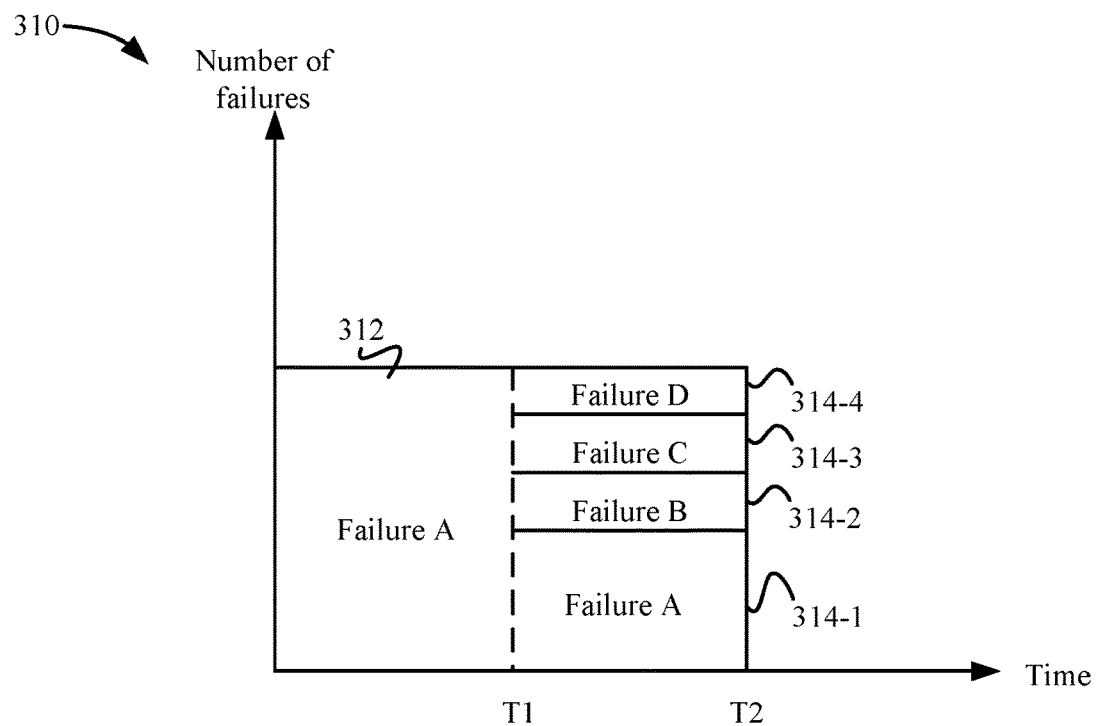
FIG. 3B shows a graph of the shift analysis over a time period according to some embodiments.

The annotations may be in different formats. FIG. 3A shows an example of a chart 300 showing a shift annotation according to some embodiments. At 302, failure A is shown for the first analysis over a time period, such as a day. Then, at 304, the shift from failure A to failures A, B, C, and D are shown with associated percentages. For example, the percentages may be 50%, 20%, 20%, and 10% for failures A, B, C, and D, respectively. Additionally, FIG. 3B shows a graph 310 of the shift analysis over a time period according to some embodiments. The X axis of graph 310 is time and the Y axis is the number of failures. At 312, failure A is shown before a time T1. This may be the time before version 2 is run on a portion of the data set. The number of failures that were detected for failure A remained stable over the time period. Then, after time T1 to time T2, a second version of analysis engine 108 is used and a shift is shown. The different bars show the percentages of the shift. For example, at 314-1, the amount of failure A is shown. As can be seen, failure A is about half of the failures now. Then, at 314-2, 314-3, and 314-4, a shift from failure A to failures B, C, and D, respectively, is shown. The amount of failures for failures B, C, and D are less than the amount of failures for failure A in this case. However, different apportionments may be appreciated. The example described was a 1:N correlation, but other correlations may be annotated in a similar fashion.

Method Flowcharts

Figure 4:
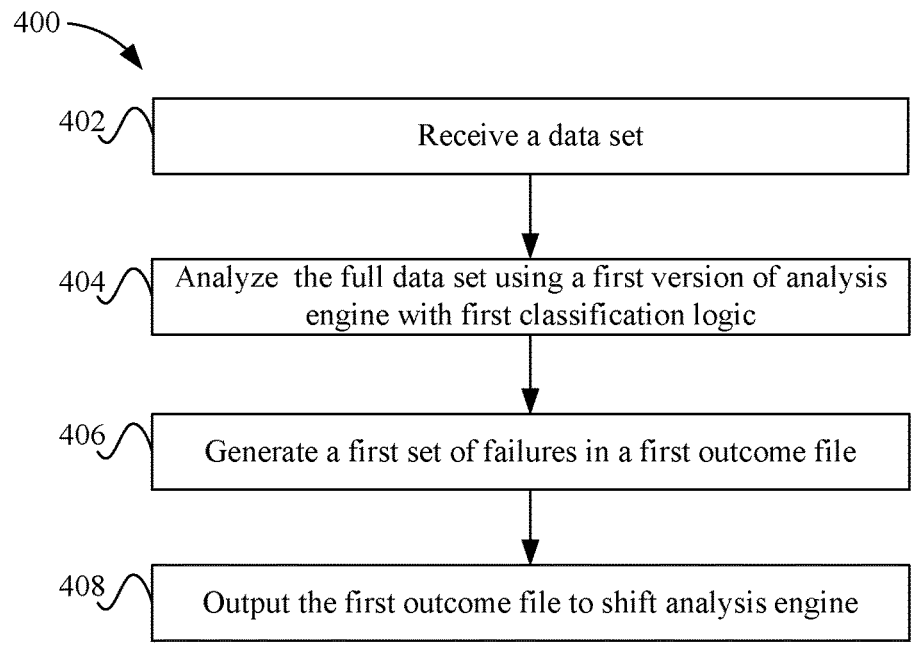
FIG. 4 depicts a simplified flowchart for performing the first analysis according to some embodiments.

FIG. 4 depicts a simplified flowchart 400 for performing the first analysis according to some embodiments. At 402, analysis system 102 receives a data set. For example, during a time slot, such as one day, log files may be received for the entire day. A data set may be partitioned based on an application. The analysis of failures may be separately performed for each application. For example, failures for a word processing application are analyzed separately from a spreadsheet application. The analysis of failures for pivots of each application may be performed. The number of pivots may be based on application version and operating system version. In other embodiments, failures for multiple applications and/or operating systems may be analyzed together.

At 404, a first version of analysis engine 108 analyzes the full data set using first classification logic. At 406, analysis engine 108 generates a first set of failures in a first outcome file. At 408, analysis engine 108 outputs the first outcome file to shift analysis engine 206.

Figure 5:
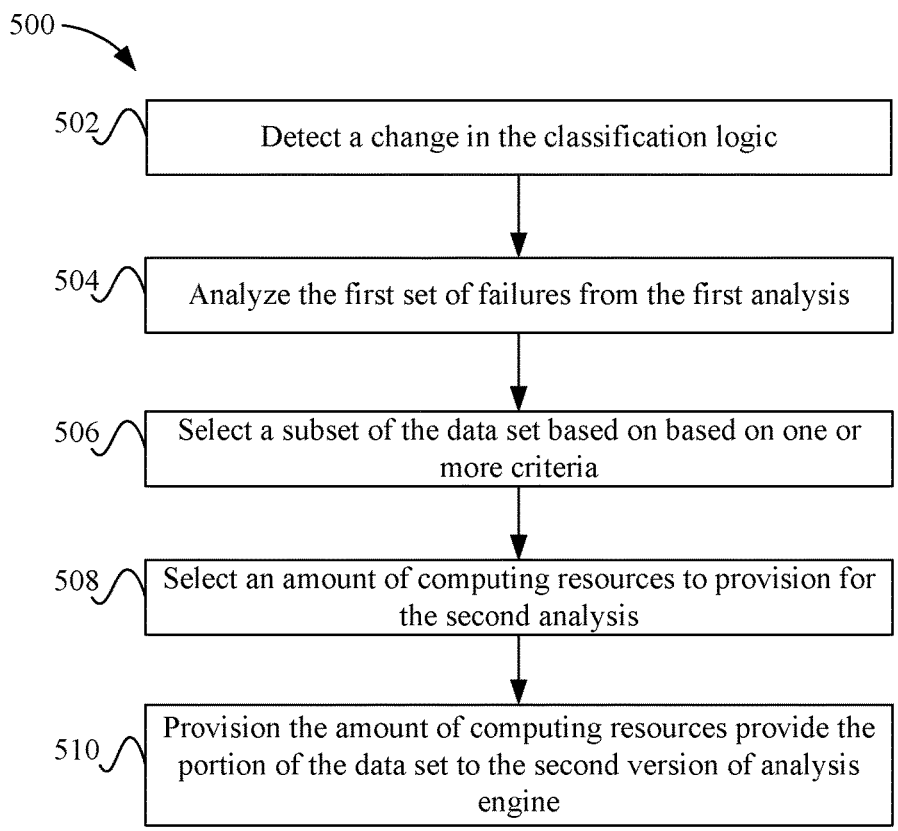
FIG. 5 depicts a simplified flowchart of a method for selecting a portion of the data set for a second analysis according to some embodiments.

Over time, the classification logic may be changed in analysis engine 108. FIG. 5 depicts a simplified flowchart 500 of a method for selecting a portion of the data set for a second analysis according to some embodiments. It will be understood that this process may be performed for multiple data sets and outcome files.

At 502, controller 106 detects a change in the classification logic. For example, a second version of analysis engine 108 may be developed with second classification logic. In one example, a change may be detected based on a release schedule for the second version of analysis engine 108. In another example, an input may be received that indicates there has been a change in the classification logic.

At 504, shift analysis engine 206 analyzes the first set of failures from the first analysis. At 506, shift analysis engine 206 selects a subset of the data set based on based on one or more criteria. Then, at 508, shift analysis engine 206 selects an amount of computing resources 112 to provision for the second analysis. The amount of computing resources may be based on the amount of the data set being analyzed. In another embodiment, the amount may be selected based on this being the first iteration of the second analysis, such as there may be a set amount of resources configured for a first iteration of the second analysis. In subsequent iterations, the amount of computing resources may be increased by a set amount or not increased at all. At 510, resource provisioner 202 can provision the amount of computing resources 112 and data set selector 204 provides the portion of the data set to the second version of analysis engine 108.

Figure 6:
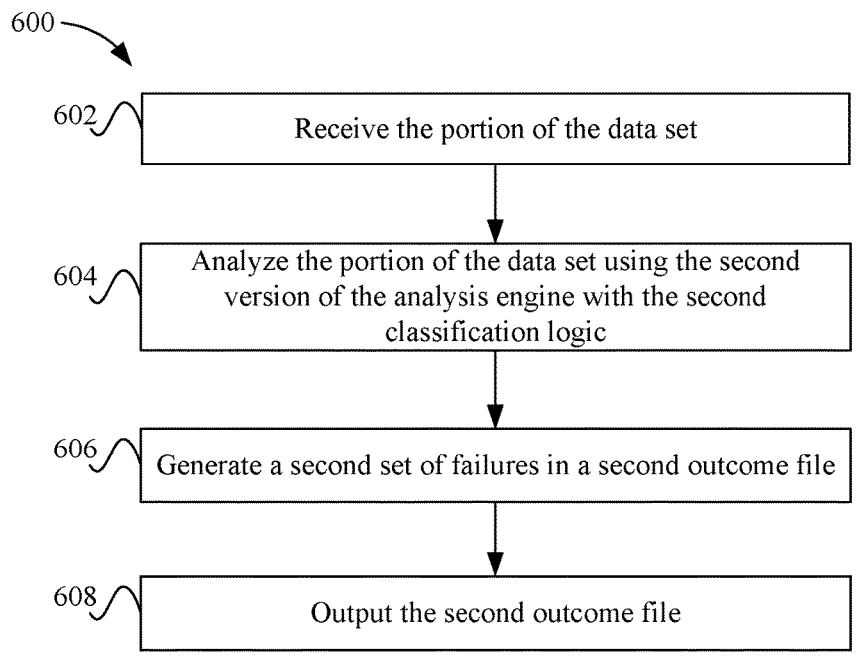
FIG. 6 depicts a simplified flowchart of a method for performing the second analysis according to some embodiments.

FIG. 6 depicts a simplified flowchart 600 of a method for performing the second analysis according to some embodiments. At 602, the second version of analysis engine 108 receives the portion of the data set. At 604, the second version of analysis engine 108 analyzes the portion of the data set using the second classification logic. At 606, the second version of analysis engine 108 generates a second set of failures in a second outcome file. Then, at 608, the second version of analysis engine 108-2 outputs the second outcome file to controller 106.

Figure 7:
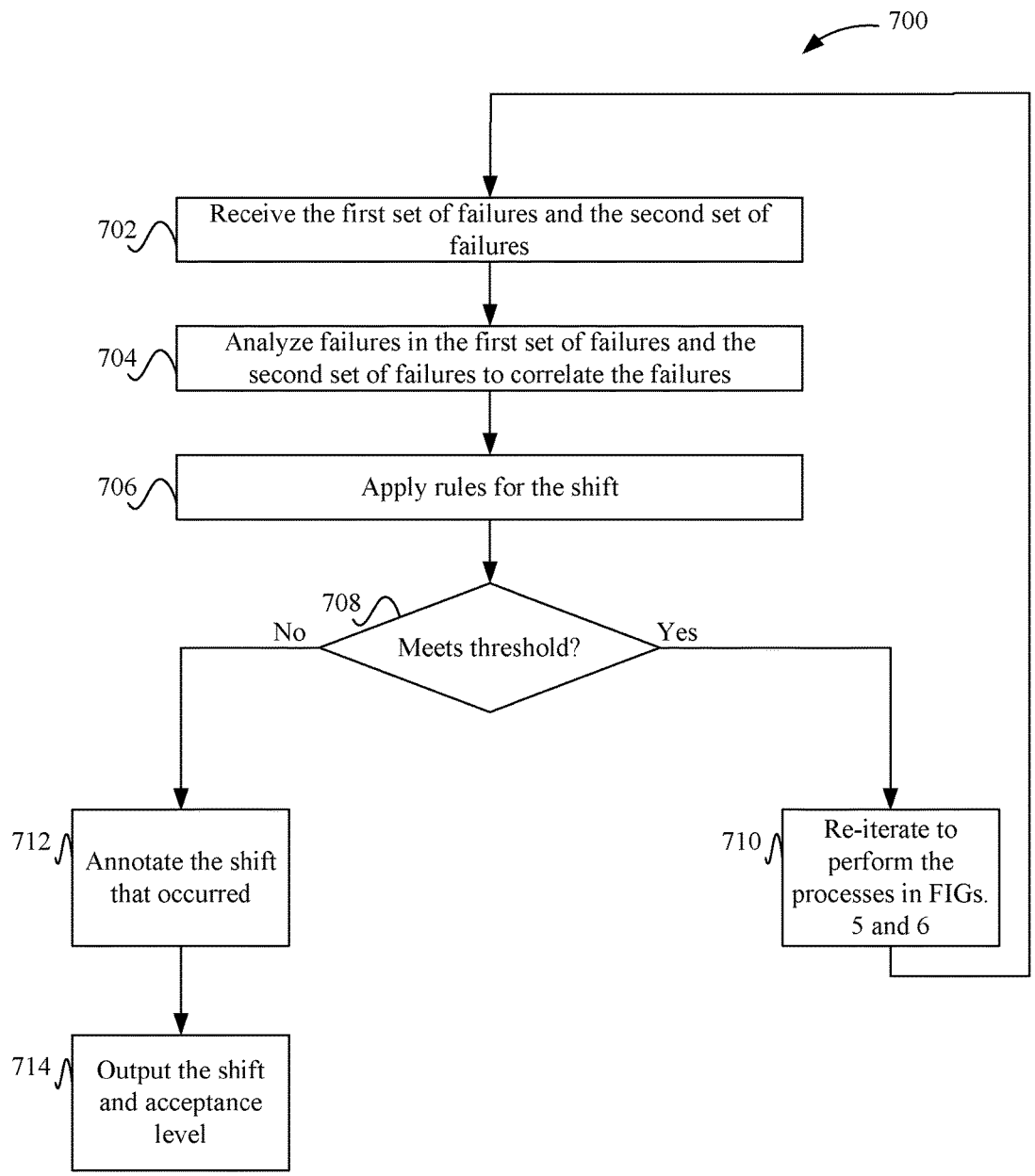
FIG. 7 depicts a simplified flowchart of a method for analyzing the shift in failures according to some embodiments.

After receiving the second outcome file, shift analysis engine 206 then determines if an additional iteration is needed. FIG. 7 depicts a simplified flowchart 700 of a method for analyzing the shift in failures according to some embodiments. At 702, shift analysis engine 206 receives the first set of failures and the second set of failures. At 704, shift analysis engine 206 analyzes failures in the first set of failures and the second set of failures to correlate the failures. For example, the failures may be correlated in a 1:1, 1:N, or an N:1 correlation.

At 706, shift analysis engine 206 applies rules for the shift. For example, the rules may be based on analyzing variations between different sets of log files as described above. At 708, shift analysis engine 206 determines if the rules meet a threshold. By meeting a threshold, a comparison applied by the rules may be at or above a threshold, above the threshold, below the threshold, or other configured ways of meeting the threshold. If the rules do not meet the threshold, at 710, the process reiterates to FIGS. 5 and 6 to determine a different portion of the data set. The second analysis is then performed again and the process of FIG. 7 applies the rules to the second set of failures again against previous failures that were generated.

If the rules do meet the threshold, at 712, annotator 208 annotates the shift that occurred. For example, every shift that is detected may be annotated along with a confidence level. At 712, annotator 208 outputs the shift and the confidence level. For example, every shift that was detected and confidence level is output in a shift analysis file.

CONCLUSION

Accordingly, some embodiments save computing resources by only re-executing a portion of the data set with a second version of analysis engine 108-2. Also, the annotation of the shift allows users to determine how failures shift as the analysis engine changes classification logic. Accordingly, when a new version of the analysis engine is released and goes live, users can see how the failures may shift due to using the new version.

System Example

Figure 8:
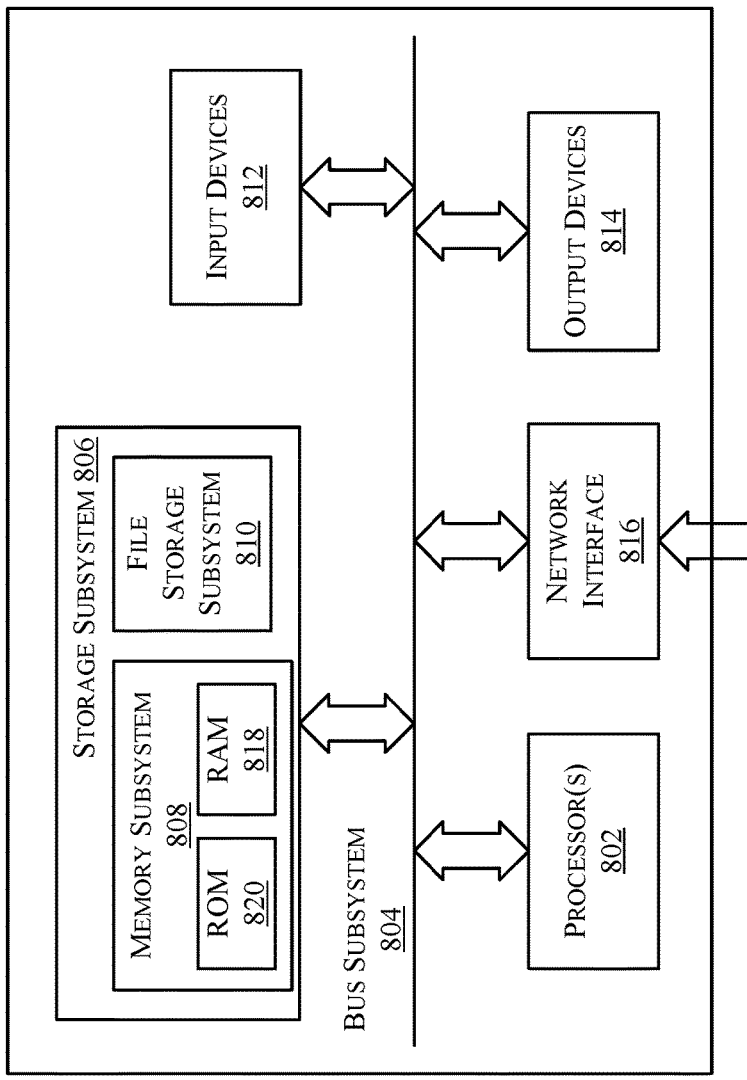
FIG. 8 is a simplified block diagram of a computer system according to some embodiments.

FIG. 8 is a simplified block diagram of a computer system 800 according to some embodiments. In some embodiments, computer system 800 can be used to implement analysis system 102 Computer system 800 can be used to implement any of the computing devices, systems, or servers described in the foregoing disclosure. As shown in FIG. 8, computer system 800 includes one or more processors 802 that communicate with a number of peripheral devices via a bus subsystem 804. These peripheral devices include a storage subsystem 806 (comprising a memory subsystem 808 and a file storage subsystem 810), user interface input devices 812, user interface output devices 814, and a network interface sub system 816.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple busses.

Network interface subsystem 816 can serve as an interface for communicating data between computer system 800 and other computer systems or networks. Embodiments of network interface subsystem 816 can include, e.g., an Ethernet card, a Wi-Fi and/or cellular adapter, a modem (telephone, satellite, cable, ISDN, etc.), digital subscriber line (DSL) units, and/or the like.

User interface input devices 812 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 800.

User interface output devices 814 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 800.

Storage subsystem 806 includes a memory subsystem 808 and a file/disk storage subsystem 810. Subsystems 808 and 810 represent non-transitory computer-readable storage media that can store program code and/or data that provide the functionality of embodiments of the present disclosure.

Memory subsystem 808 includes a number of memories including a main random access memory (RAM) 818 for storage of instructions and data during program execution and a read-only memory (ROM) 820 in which fixed instructions are stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
   one or more computer processors; and
   a non-transitory computer-readable storage medium comprising instructions, that when executed, cause the one or more computer processors to:
   select a data set based on one or more criteria, the data set including information that is generated based on one or more applications experiencing events;
   receive a first analysis of the data set classifying the data set into a first set of failures using an analysis engine, wherein the analysis engine is configured with first classification logic that performs the classifying;
   select a portion of the data set to re-run using the analysis engine, wherein the analysis engine is configured with second classification logic to perform the classifying that is different from the first classification logic;
   receive a second analysis of the portion of the data set classifying the portion of the data set into a second set of failures using the second classification logic of the analysis engine;
   correlate one or more first failures in the first set of failures that shift to one or more second failures in the second set of failures, the shift resulting from performing the classifying using the second classification logic instead of the first classification logic; and
   output an annotation describing the one or more first failures in the first set of failures that shift to one or more second failures.

2. The computer system of claim 1, further comprising instructions, that when executed, cause the one or more computer processors to:
   apply one or more rules for the second analysis;
   determine if the one or more rules meet a threshold; and
   accept the second set of failures when the one or more rules meet the threshold.

3. The computer system of claim 1, further comprising instructions, that when executed, cause the one or more computer processors to:
   determine first percentages for failures in the first set of failures;
   determine second percentages for the failures in the second set of failures;
   for each failure, determine whether the first percentage and the second percentage are within a threshold;
   when the first percentage and the second percentage are within the threshold for the failures in the first set of failures and the second set of failures, accept the second set of failures; and
   when the first percentage and the second percentage are not within the threshold, select another portion of the data set to perform the second analysis.

4. The computer system of claim 3, further comprising instructions, that when executed, cause the one or more computer processors to:
   when one or more rules do not meet the threshold, perform:
   select another portion of the data set to analyze; and
   receive another second analysis of the another portion of the data set classifying the another portion of the data set into a third set of failures using the second classification logic of the analysis engine.

5. The computer system of claim 4, further comprising instructions, that when executed, cause the one or more computer processors to:
   determine first percentages for failures in the second set of failures;
   determine second percentages for the failures in the third set of failures;
   for each failure, determine whether the first percentage and the second percentage are within a threshold;

when the first percentage and the second percentage are within the threshold for the failures in the first set of failures and the second set of failures, accept the third set of failures; and when the first percentage and the second percentage are not within the threshold, select another portion of the data set to perform the second analysis.

6. The computer system of claim 5, further comprising instructions, that when executed, cause the one or more computer processors to:

continue to selecting other portions of the data set to perform the second analysis and continuing to receive other second analyses from the analysis engine on the other portions of the data set until the first percentages and the second percentages meets the threshold.

7. The computer system of claim 1, further comprising instructions, that when executed, cause the one or more computer processors to:

determine new failures in the second set of failures that do not exist in the first set of failures;

for each new failure, determine whether a percentage of the new failure in the second set of failures is within a threshold; and when the percentage is not within the threshold, select another portion of the data set to perform the second analysis.

8. The computer system of claim 1, further comprising instructions, that when executed, cause the one or more computer processors to:

configure a first set of computing resources in which to run the analysis engine for the first analysis; and configure a second set of computing resources in which to run the analysis engine for the second analysis, the second set of computing resources being less than the first set of computing resources.

9. The computer system of claim 8, further comprising instructions, that when executed, cause the one or more computer processors to:

select the second set of computing resources based on an amount of data in the portion of the data set.

10. The computer system of claim 1, wherein selecting the portion of the data set comprises:

select information for events in the data set based on a number of occurrences of failures in the first set of failures that result from the events being above a threshold.

11. The computer system of claim 1, wherein correlating one or more first failures in the first set of failures that shift to one or more second failures in the second set of failures comprises:

determining when a same event caused a first failure in the first set of failures caused a second failure in the second set of failures.

12. The computer system of claim 1, wherein correlating one or more first failures in the first set of failures that shift to one or more second failures in the second set of failures comprises:

determine a 1:N correlation of a first failure to N second failures, a 1:1 correlation of a first failure to a second failure, or an N:1 correlation of N first failures to 1 second failure.

13. The computer system of claim 1, wherein outputting the annotation describing the shift comprises:

determine a confidence level of the shift based on the second set of failures; and output information for the shift along with information for the confidence level.

14. The computer system of claim 1, wherein outputting an annotation describing the shift comprises:

determine confidence level of the shift based on the second set of failures; and generate a representation describing the shift along with the confidence level.

15. A method comprising:

selecting, by a computing device, a data set based on one or more criteria, the data set including information that is generated based on one or more applications experiencing events;

receiving, by the computing device, a first analysis of the data set classifying the data set into a first set of failures using an analysis engine, wherein the analysis engine is configured with first classification logic that performs the classifying;

selecting, by the computing device, a portion of the data set to re-run using the analysis engine, wherein the analysis engine is configured with second classification logic to perform the classifying that is different from the first classification logic;

receiving, by the computing device, a second analysis of the portion of the data set classifying the portion of the data set into a second set of failures using the second classification logic of the analysis engine;

correlating, by the computing device, one or more first failures in the first set of failures that shift to one or more second failures in the second set of failures, the shift resulting from performing the classifying using the second classification logic instead of the first classification logic; and outputting, by the computing device, an annotation describing the one or more first failures in the first set of failures that shift to one or more second failures.

16. A computer system comprising:

one or more computer processors; and a non-transitory computer-readable storage medium comprising instructions, that when executed, cause the one or more computer processors to:

select a data set based on one or more criteria, the data set including information that is generated based on one or more applications experiencing events;

receive a first analysis of the data set classifying the data set into a first set of failures using an analysis engine, wherein the analysis engine is configured with first classification logic that performs the classifying;

receive a second analysis of a first portion of the data set classifying the first portion of the data set into a second set of failures using the analysis engine, wherein the analysis engine is configured with second classification logic different from the first classification logic that performs the classifying;

receive a third analysis of a second portion of the data set classifying the second portion of the data set into a third set of failures using the second classification logic of the analysis engine;

compare first percentages for failures in the first set of failures and second percentages for the failures in the second set of failures to a threshold;

accept the third set of failures when the threshold is met; and when an acceptance level does not meet the threshold, continue to:

receive additional analysis of additional portions of the data set classifying the additional portions of the data set into additional sets of failures using the second classification logic of the analysis engine; and compare additional percentages for failures in the additional set of failures and at least one previous percentage for the failures in at least one previous set of failures to the threshold until the threshold is met.

17. The computer system of claim 16, wherein the at least one previous percentage for the failures in at least one previous set of failures includes the first percentages for failures in the first set of failures and the second percentages in the second set of failures.

18. The computer system of claim 16, further comprising instructions, that when executed, cause the one or more computer processors to:
configure a first set of computing resources to run the analysis engine for the first analysis; and
configure a second set of computing resources to run the analysis engine for the second analysis, the second set of computing resources being less than the first set of computing resources.

19. The computer system of claim 16, further comprising:
correlating one or more first failures in the first set of failures that shift to one or more second failures in the second set of failures, the shift resulting from performing the classifying using the second classification logic instead of the first classification logic; and
outputting an annotation describing the one or more first failures in the first set of failures that shift to one or more second failures.

20. The computer system of claim 16, further comprising instructions, that when executed, cause the one or more computer processors to:
determine new failures in the third set of failures that do not exist in the second set of failures;
for each new failure, determine whether a percentage of the new failure in the third set of failures is within a second threshold; and
when the percentage is not within the second threshold, continue to:
receive additional analysis of additional portions of the data set classifying the additional portions of the data set into additional sets of failures using the second classification logic of the analysis engine; and
compare additional percentages for failures in the additional set of failures and at least one previous percentage for the failures in at least one previous set of failures to the threshold until the threshold is met.

\* \* \* \* \*